United States Patent Office 3,025,572
Patented Mar. 20, 1962

3,025,572
METHOD OF MOLDING AMORPHOUS-CRYSTALLINE POLYMERS AND ARTICLES MOLDED THEREFROM
Achille Bosoni, Milan, Italy, assignor to Montecatini Societa Generale per l'Industria Mineraria e Chimica, a corporation of Italy
No Drawing. Filed Oct. 14, 1957, Ser. No. 689,780
Claims priority, application Italy Oct. 23, 1956
7 Claims. (Cl. 18—55)

This invention relates to methods for making shaped thermoplastic articles by die-molding procedures.

It is known that molded articles may be made by compression or injection die shaping of thermoplastic synthetic resins, such as normally solid polyethylene, by heating the resin to the softening point thereof or to temperatures slightly above the softening point, so that the resin takes the form of the die, from which the resulting molded article can be withdrawn after suitable cooling thereof.

In order to obtain shaped articles of the available thermoplastic polymers having an amorphous-crystalline structure, which articles are not brittle, have high flexural strength, and other desirable characteristics, it is necessary to effect the die-shaping at temperatures in a narrow range and usually at temperatures below or only slightly above the melting point of the polymer, i.e., below or only slightly above the temperature at which the crystalline portion passes to the amorphous state. For example, solid polymers of ethylene which have an amorphous-crystalline structure cannot be die-shaped at temperatures more than about 10° C. above the melting temperature, without brittleness of the shaped article, and even at those temperatures, the articles obtained have poor mechanical properties such as low flexural strength. If the polyethylene is heated to a temperature greater than about 10° C. above the melting point, all of the properties of the polymer including the mechanical resistance are degraded, and inferior shaped articles are obtained. Moreover, only relatively thick die-shaped articles of the known thermoplastic polymers are mechanically strong.

One object of the present invention is to provide new thin die-shaped or die-molded articles of thermoplastic synthetic polymers which are mechanically strong.

Another object is to provide a method for making non-brittle shaped articles of thermoplastic synthetic polymers by die-molding processes in which the die-molding can be carried out at temperatures included in a wide range.

These and other objects are accomplished by the present invention according to which shaped articles are obtained by compression or injection molding of polymers of alpha-olefines comprising isotactic (crystalline) poly (alpha-olefine).

Solid high molecular weight polymers of propylene and other alpha-olefines of the general formula $CH_2=CHR$ in which R is a hydrocarbon radical, are new in the art. As has been disclosed recently by G. Natta and his co-workers, such polymers can exist in two different stereoisomeric forms and may be crystalline (crystallizable) or amorphous and non-crystalline (not crystallizable).

The crystalline and non-crystalline polymers were called "isotactic" and "atactic" polymers, respectively, by G. Natta. Those terms have been adopted by the art and are used herein.

The isotactic (crystalline or crystallizable) polymers of the alpha-olefines are linear, head-to-tail polymers consisting essentially of macromolecules in which substantially all of the asymmetric tertiary main-chain carbon atoms of adjacent monomeric units have the same steric configuration and the main chain of the macromolecules, if fully extended in a plane, shows substantially all of the R groups on one side of the plane and all of the hydrogen atoms bound to the tertiary carbon atoms on the opposite side.

The atactic polymers are also linear, head-to-tail polymers consisting essentially of macromolecules in which tertiary asymmetric carbon atoms of the main chain having the same steric configuration have substantially a random distribution, and the main chain of the macromolecules, if fully extended in a plane, shows the R groups and the hydrogen atoms bound to the tertiary carbon atoms substantially in random distribution on the two sides of the plane.

As Natta et al. have shown the stereoisomeric polymers are contained in the polymerizate obtained by polymerizing the alpha-olefine with the aid of a catalyst prepared from a compound, e.g., a halide or acetylacetonate, of a transition metal of groups IV to VI of the periodic table and a metallorganic compound of a metal of groups I–III of the periodic table, in a hydrocarbon solvent inert to the catalyst, in the absence of air, and at atmospheric or only slightly increased pressure and a temperature of −80° C. to +250° C. and can be separated on the basis of their different steric structures by fractionation of the crude polymerizate with selective solvents.

For example, in the case of polypropylene, the polymerizate can be extracted successively with hot acetone, ether and n-heptane to separate, successively, low molecular weight oily polymers, atactic polymers, and partially crystalline polymers, and leave a residue of highly isotactic polypropylene.

Natta et al. have also shown that the polymerization of the alpha-olefine can be oriented to the production of prevailingly (over 50%) to substantially completely isotactic polymers, or to the production of prevailingly to substantially completely atactic polymers, by selection of the catalyst of the class mentioned. Thus, if the catalyst is a solid which is difficultly dispersible in the hydrocarbon solvent, as is the reaction product of a low valency compound of the transition metal, e.g., titanium trichloride and a metal alkyl such as triethyl aluminum, the polymerizate comprises prevailingly to completely isotactic polymers. On the other hand, if the catalyst is a liquid which is miscible with and readily dispersible in the hydrocarbon solvent, for instance if it is the reaction product of triethyl aluminum and a high valency compound of the transition metal like titanium tetrachloride, the polymerizate comprises prevailingly to completely atactic polymers.

It is found, in accordance with this invention, that the solid propylene polymers comprising isotactic polypropylene, even those polymers having a very high molecular weight above 600,000, can be die-molded under pressure when the polymers are heated to a temperature in a very wide but well-defined range above the melting point thereof. The die-molded articles thus obtained have high mechanical strength, are unbreakable under normal conditions, resistant to high temperatures, transparent, readily dyeable with dull or transparent dyes, chemically inert, non-toxic, odorless, tasteless, and characterized by dielectric properties. Many of these characteristics of the die-shaped articles of the propylene polymers, and especially the tensile or compressive strength and the heat-resistance, are markedly superior to the characteristics of articles obtained by die-molding other known thermoplastic polymers. Because of this combination of desirable properties, and particularly the high mechanical strength, and the conditions under which they can be produced, very thin die-shaped articles can be obtained which are just as strong as much thicker die-shaped articles of the known thermoplastic polymers.

This results in a considerable saving in the cost of the article and also permits of the production of thin die-shaped articles which are useful for purposes for which thick articles are not adapted.

The average molecular weight of the solid propylene polymers comprising isotactic polypropylene may be, for example, between 50,000 and 800,000 or even higher. According to this invention the propylene polymer to be die-shaped is selected on the basis of the average molecular weight thereof, depending on whether the molding is to be accomplished by injection or compressive die-shaping. Thus, when the polymer is to be injection molded, it may be preferred to select a polymer having an average molecular weight between about 50,000 and about 200,000. This is not a rigid requirement, however. It is possible to die-shape, under the present conditions, the propylene polymers having an average molecular weight above 500,000 and, in fact, such polymers may be preferred when articles having extremely high mechanical strength and heat-resistance are desired or required for any particular use.

On the other hand, for pressure die-shaping, the solid propylene polymers selected may have any molecular weight for example an average molecular weight between, say, 20,000 and 800,000 or even higher.

These solid propylene polymers comprising isotactic polypropylene in admixture with atactic polypropylene have a softening temperature range but do not have a sharp melting point, i.e. a sharply defined temperature at which the crystalline portion passes to the amorphous state. This passage from the crystalline state to the amorphous state is indicated by the visual field becoming totally dark during progressive heating of a lamina of the polymer as observed under a microscope with crossed nicols. For example, the melting point (as defined above) of a highly crystalline polypropylene is 164–168° C.

The softening range of the propylene polymers, as well as the viscosity thereof when heated, vary with, and depend on, the average molecular weight of the polymers.

In contrast to experience had with other thermoplastic polymers having an amorphous-crystalline structure, such as the polyethylene discussed above, I have found, surprisingly, that die-shaped articles having the most desirable properties are obtained by heating the solid propylene polymers comprising atactic and isotactic polypropylene at temperatures remarkably above the melting point. I have also found that, uniquely, the propylene polymers can be die-shaped at temperatures in a very wide range, above and below which the articles die-shaped from the other known thermoplastic polymers are brittle or at any rate do not exhibit the most desirable characteristics.

In general, when the shaped articles are obtained by injection molding of the solid propylene polymers, the articles have the most desirable characteristics when the injection molding is carried out at temperatures in the range between 200° C. and 350° C. Shaped articles of the propylene polymers having an average molecular weight between 50,000 and 250,000 and made according to this invention by injection molding the polymers at temperatures in the stated range have been found to have the following characteristics:

| | |
|---|---|
| Tensile yield stress kg./cm.$^2$ | 400 |
| Elongation at yield, percent | 100–600 |
| Brinell hardness (with a ½ x 1″ ball; charge 70 lbs.) | 1500–2000 |
| Softening point, Vicat (charge 5 kg.), °C | 100–110 |

In die-shaping the propylene polymers, unless the heating time is correlated with the temperature and controlled as a function of the temperature, the shaped articles do not have optimum characteristics. For instance, if the polymer is injection molded at a temperature higher than 300° C., and the molding time is unduly prolonged, the polymer may become very fluid, develop gases, and escape from the mold in flashes, and the molded article may be brittle, and contain bubbles and scales in the thicker portions thereof.

It is not possible to state precisely the optimum molding time for each temperature which may be used, since that is dependent on the molecular weight of the starting polymeric propylene, as well as on the particular molding device employed. However, it can be said that, in general, the optimum molding time varies inversely with the temperature of 200–300° C., between, generally speaking 10 minutes and 5 minutes. Thus, it is found that at a temperature of 350° C., the mechanical and physical characteristics of the molded article tend to be degraded if the molding time is as long as 10 minutes, whereas such degradation at a molding temperature of 330° C. is not noticeable unless the molding time is longer, and up to 15 or 20 minutes. The degradation on exposure of the polymer to the high temperatures for the longer times mentioned can include depolymerization of the polymer so that polymers having a molecular weight above 100,000 prior to injection molding thereof, may have, after the molding, a molecular weight of about 30,000. Shaped articles comprising the polymers having a molecular weight of 30,000 or so have certain fields of utility. However, where the depolymerization to lower molecular weight is not desired the molding time is suitably curtailed and the temperature is selected so that the molding time is sufficient to bring the polymer to the shape of the die without degradation thereof.

Any of the commonly used devices for injection molding a thermoplastic material can be used in practicing the invention. However, apparatus of the kind adapted to "direct head injection" of the propylene polymers is preferred because it permits the injection to be carried out at lower temperatures, and withdrawal of the shaped article from the mold can be accomplished easily and simply. Devices having an injection channel of the "capillary" type can be used but usually require higher molding temperatures in order to fill the die and shrinkage of the article during cooling thereof in the die may result in a tendency of the article, particularly if it is conical, to be blocked on the male member, so that it is less readily withdrawn from the mold.

The molding pressure can be varied, depending on the average molecular weight of the polypropylene.

Dyes, pigments, fillers and other effect materials can be incorporated into the polymeric propylene before it is die-shaped. Preferably, when such adjuvants are used, they are selected so as not to appreciably modify the melting point of the crystalline portion of the polymer. The effect of the adjuvant can be determine by preliminary test.

The following examples are given to illustrate specific embodiments of the die-shaping of the normally solid propylene polymers having the amorphous-crystalline structure, it being understood that the examples are not intended as limitative.

*Example 1*

Thirteen grams of polypropylene having a molecular weight of 400,000 and an amorphous crystalline structure (i.e. comprising atactic and isotactic polypropylenes) were placed in a press with parallel plates having a surface of 12 x 12 cm., and heated at 220° C. for 10 minutes under a pressure of 450 kg./cm.$^2$. After cooling to 100° C., the lamina having a thickness of 1.2 cm. was withdrawn. It was mechanically strong, flexible, and non-brittle.

*Example 2*

An amorphous-crystalline polypropylene having a molecular weight of 150,000 was molded in an injection press having a capacity of 40 gms. A 4-cavities die was used for laminae of 42 x 50 mm., with a thickness decreasing from 4.8 mm. to 1.7 mm. along the longest side. The softening chamber had a capacity of 100 gms., corresponding to 5 moldings.

By molding the polypropylene with 1-minute cycles at different temperatures in the range 200° C. to 360° C., transparent, perfect laminae having a smooth surface and completely free of brittleness at room temperature were obtained.

On the other hand, when the polypropylene was exposed in the softening chamber to the temperatures shown below, for the longer molding cycles shown, the laminae obtained were brittle and had a spongy structure at the thickest areas thereof:

| Temperature: | Time (min.) |
|---|---|
| 350 | 10 |
| 330 | 15 |
| 300 | 30 |

Under those condition, also, the polypropylene became very fluid, developed a large amount of gas, and tended to flash to a marked extent.

*Example 3*

An oval basin 81 cm. long, 45 cm. wide and 18 cm. high, and having a weight of 1900 gms. was molded from pigmented amorphous crystalline polypropylene having a molecular weight of 150,000, using a press with a softening chamber of 12 kg. capacity.

By molding the polymer at 170–300° C. with a cycle of 5 minutes a strong, perfect, non-bittle basin resistant to strong impacts was obtained.

In another similar molding operation, carried out for comparison purposes, but using a 5 minute cycle at 350° C., the basin obtained was brittle and had a non-compact structure along the edge which was 6 mm. thick, and the polypropylene in the molded basin was degraded to a molecular weight of 33,000.

*Example 4*

Example 3 was repeated, except that the die used was of the kind to produce a truncated cone pail having an upper diameter of 25 cm., a capacity of 6 liters, and a weight of 380 gms.

Very good results were obtained by deadhead injection of the polypropylene using a 2 minute cycle at 270° C.

When the polymeric propylene was allowed to stand in the softening chamber at 270° C. for 45 minutes, the pail obtained had a good appearance and a compact structure, but low impact resistance.

*Example 5*

Examples 3 and 4 were repeated, except that capillary injection of the amorphous-crystalline polypropylene was used. An injection temperature of 350° C. was required, and more difficulty was experienced in withdrawing the pail from the mold.

*Example 6*

A refrigerator door frame having the dimensions 59 x 122 cm. and weighing 850 gms. was molded in a 1300 gm. press from amorphous-crystalline polypropylene having a molecular weight of 150,000 and pigmented with $TiO_2$. The temperatures in the different sections of the softening chamber from the feed box to the nozzle were 220° C., 260° C., 260° C., and 260° C. The molding cycle was 2 minutes. A perfect frame resistant to flexure and impact was obtained.

In comparison, when the molding was repeated using temperatures in the different sections of the softening chamber from the feed box to the nozzle of 140° C., 200° C., 200° C., and 180° C., with a 2 minute cycle, the molding of the frame was not completed.

Also in contrast, the frame obtained using temperatures in the different sections of the softening chamber of 200° C., 240° C., 240° C., and 240° C., and a cycle of 2 minutes, had a tendency to brittleness and cracked when it was bent.

It will be apparent that the molding conditions, i.e., temperature, molding cycle, and type of molding device used for the injection or compressive molding of the polymeric propylene comprising isotactic polypropylene can be selected for optimum results depending on the average molecular weight of the polymer.

In general, it can be stated that, for the optimum results, and depending on the apparatus used, the polymeric propylene having the amorphous-crystalline structure should be heated to a temperature in a range the lower limit of which is about 25% above the value of the optical fusion temperature of the crystalline portion of the polymer, and the upper limit of which corresponds to about twice the value of the optical fusion temperature of the crystalline portion of the polymer. These lower and upper limits of the temperature range in which the polymer is heated vary with the average molecular weight of the particular polypropylene used. The heating time depends on the temperature and the apparatus to be used, and is such that the heated polymer is in optimum condition for injection or compressive die-shaping thereof to yield non-brittle articles of high mechanical strength. The optimum heating time can be readily determined for the amorphous-crystalline polypropylenes of any particular molecular weight.

As noted above, the polypropylene has an amorphous-crystalline structure. That is to say, it is linear, head-to-tail and comprises propylene polymers of both atactic and isotactic structure.

For many purposes, it is preferred to die-shape the articles from prevailingly (over 50%) to substantially completely isotactic polypropylene.

It will be evident that a wide variety of articles of different shapes and sizes can be made according to this invention.

Since changes and variations in details can be made in practicing the invention without departing from the spirit thereof it is intended to include in the scope of the appended claims all such modifications as may be apparent to those skilled in the art.

What is claimed is:

1. A method for making shaped articles of a linear, regularly head-to-tail polymerizate of an alpha-olefin of the formula $CH_2=CHR$ in which R is a hydrocarbon radical, which polymerizate has a molecular weight of 50,000 to 800,000 and higher and comprises amorphous, atactic polymeric alpha-olefin and isotactic, crystalline polymeric alpha-olefin, which process comprises conditioning the polymerizate for shaping by heating it to a temperature depending on the molecular weight and in a range the lower limit of which is about 25% above the optical fusion temperature in degrees centigrade of the isotactic, crystalline polymeric alpha-olefin and the upper limit of which corresponds to about twice the optical fusion temperature for the isotactic, crystalline polymeric alpha-olefin, for a time varying inversely with the temperature between about 10 minutes and about 5 minutes and predetermined to insure that the article obtained under the particular shaping conditions is not brittle, and then shaping the polymerizate by means of a die at a temperature in said range.

2. A method for making shaped articles of a linear, regularly head-to-tail propylene polymerizate, which polymerizate has a molecular weight of 50,000 to 800,000 and higher and comprises amorphous atactic polypropylene, and isotactic, crystalline polypropylene, which process comprises conditioning the polymerizate for shaping by heating it to a temperature depending on the molecular weight and in a range the lower limit of which is about 25% above the optical fusion temperature in degrees centigrade of the isotactic, crystalline polypropylene and the upper limit of which corresponds to about twice the optical fusion temperature for the isotactic, crystalline polypropylene, for a time varying inversely with the temperature between about 10 minutes and about 5 minutes and predetermined to insure that the article obtained under the particular shaping conditions is not brittle, and then shaping the polymerizate by means of a die at a temperature in said range.

3. A method for making shaped articles of a linear, regularly head-to-tail polymerizate of an alpha-olefin of the formula $CH_2=CHR$ in which R is a hydrocarbon radical, which polymerizate has a molecular weight of 50,000 to 500,000 and comprises amorphous, atactic polymeric alpha-olefin and isotactic, crystalline polymeric alpha-olefin, which process comprises conditioning the polymerizate for shaping by heating it to a temperature depending on the molecular weight and in a range the lower limit of which is about 25% above the optical fusion temperature in degrees centigrade of the isotactic, crystalline polymeric alpha-olefin and the upper limit of which corresponds to about twice the optical fusion temperature for the isotactic, crystalline polymeric alpha-olefin, for a time varying inversely with the temperature between about 10 minutes and about 5 minutes and predetermined to insure that the article obtained under the particular shaping conditions is not brittle, and then shaping the polymerizate by means of a die at a temperature in said range.

4. A method for making shaped articles of a linear, regularly head-to-tail polymerizate of an alpha-olefin of the formula $CH_2=CHR$ in which R is a hydrocarbon radical, which polymerizate has a molecular weight of 50,000 to 800,000 and higher and comprises amorphous, atactic polymeric alpha-olefin and isotactic, crystalline polymeric alpha-olefin, which process comprises conditioning the polymerizate for shaping by heating it to a temperature depending on the molecular weight and in a range the lower limit of which is about 25% above the optical fusion temperature in degrees centigrade of the isotactic, crystalline polymeric alpha-olefin and the upper limit of which corresponds to about twice the optical fusion temperature for the isotactic, crystalline polymeric alpha-olefin, for a time varying inversely with the temperature between about 10 minutes and about 5 minutes and predetermined to insure that the article obtained under the particular shaping conditions is not brittle, and then shaping the polymerizate by compression molding at a temperature in said range.

5. A method for making shaped articles of a linear, regularly head-to-tail propylene polymerizate comprising amorphous, atactic polypropylene and isotactic, crystalline polypropylene and having an optical melting point of 164° C. to 168° C., which process comprises heating the polymerizate at a temperature of from 200° to 350° C. for a time varying inversely with the temperature between about 10 minutes and 5 minutes, injecting the heated polymerizate into a closed mold, and subjecting the heated polymerizate in the mold to pressure to shape the same.

6. A method for making shaped articles of a linear, regularly head-to-tail propylene polymerizate comprising amorphous, atactic polypropylene and isotactic, crystalline polypropylene, and having an optical melting point of 164° C. to 168° C., which process comprises heating the polymerizate at a temperature of from 200° C. to 350° C. for a time varying inversely with the temperature between about 10 minutes and 5 minutes, introducing the heated polymerizate into a press, and subjecting the heated polymerizate in the press to pressure to shape the same.

7. The product of the process of claim 1.

References Cited in the file of this patent

UNITED STATES PATENTS

| | | |
|---|---|---|
| 2,232,475 | Renfrew et al. | Feb. 18, 1941 |
| 2,624,916 | Persak | Jan. 13, 1953 |
| 2,791,576 | Field et al. | May 7, 1957 |

FOREIGN PATENTS

| | | |
|---|---|---|
| 131,333 | Australia | Nov. 28, 1946 |
| 526,101 | Italy | Dec. 7, 1955 |

UNITED STATES PATENT OFFICE
CERTIFICATE OF CORRECTION

Patent No. 3,025,572                      March 20, 1962

Achille Bosoni

It is hereby certified that error appears in the above numbered patent requiring correction and that the said Letters Patent should read as corrected below.

Column 5, line 28, for "170-300° C." read -- 270-300° C. --.

Signed and sealed this 14th day of August 1962.

(SEAL)
Attest:

ERNEST W. SWIDER
Attesting Officer

DAVID L. LADD
Commissioner of Patents